(12) United States Patent
Tanaka

(10) Patent No.: US 8,340,223 B2
(45) Date of Patent: Dec. 25, 2012

(54) RECEIVER AND WIRELESS COMMUNICATION SYSTEM EQUIPPED WITH THE SAME

(75) Inventor: Akio Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 12/681,190

(22) PCT Filed: Sep. 19, 2008

(86) PCT No.: PCT/JP2008/067045
§ 371 (c)(1),
(2), (4) Date: Apr. 1, 2010

(87) PCT Pub. No.: WO2009/044643
PCT Pub. Date: Apr. 9, 2009

(65) Prior Publication Data
US 2010/0226450 A1    Sep. 9, 2010

(30) Foreign Application Priority Data

Oct. 5, 2007   (JP) ................................. 2007-261982

(51) Int. Cl.
*H04L 27/00* (2006.01)
(52) U.S. Cl. ........ 375/316; 375/260; 375/317; 375/324; 375/340; 327/1; 327/37; 327/307; 327/336; 370/344; 370/480; 455/130
(58) Field of Classification Search .................. 375/260, 375/316, 317, 324, 340; 455/130; 327/1, 327/37, 307, 336; 370/344, 480
See application file for complete search history.

(56) References Cited

U.S. PATENT DOCUMENTS

| 6,763,057 | B1 * | 7/2004 | Fullerton et al. ............... 375/141 |
| 7,110,473 | B2 * | 9/2006 | Miller et al. ................... 375/316 |
| 2005/0213635 | A1 * | 9/2005 | Terada et al. .................. 375/130 |
| 2006/0203902 | A1 | 9/2006 | Froc et al. |
| 2007/0139117 | A1 | 6/2007 | Iida |
| 2008/0069183 | A1 * | 3/2008 | Terada ........................... 375/137 |

FOREIGN PATENT DOCUMENTS

| JP | 6-105186 | 12/1994 |
| JP | 3302981 | 4/2002 |
| JP | 2004-020325 | 1/2004 |
| JP | 2004-096308 | 3/2004 |
| JP | 2004-221939 | 8/2004 |

(Continued)

OTHER PUBLICATIONS

IEEE Journal of Solid-State Circuits, vol. 39, No. 12, pp. 2284, Dec. 2004.

(Continued)

*Primary Examiner* — Leon Flores
(74) *Attorney, Agent, or Firm* — Young & Thompson

(57) ABSTRACT

A receiver includes: an amplifier that amplifies a received broadband signal up to a predetermined level; a first switch that switches an output signal from the amplifier; a signal generator that generates a signal for controlling a switching operation of the first switch; an integration capacitor that integrates an output signal from the first switch; a comparator that compares an output voltage from the integration capacitor with a predetermined voltage; and a reset circuit that discharges electrical charges accumulated in the integration capacitor based on a comparison result from the comparator.

20 Claims, 8 Drawing Sheets

FOREIGN PATENT DOCUMENTS

| | | |
|---|---|---|
| JP | 2005-039526 | 2/2005 |
| JP | 2005-175819 | 6/2005 |
| JP | 2005-184141 | 7/2005 |
| JP | 3705102 | 8/2005 |
| JP | 2006-203686 | 8/2006 |
| JP | 2006-279947 | 10/2006 |
| JP | 2007-097186 | 4/2007 |
| JP | 2007-110326 | 4/2007 |
| JP | 2007-150527 | 6/2007 |
| JP | 2007-060509 | 8/2007 |

OTHER PUBLICATIONS

International Search Report, PCT/JP2008/067045, Nov. 4, 2008.

* cited by examiner (a)　　　　　　(b)　　　　　　(c)

RECEIVER AND WIRELESS COMMUNICATION SYSTEM EQUIPPED WITH THE SAME

TECHNICAL FIELD

The present invention relates to a receiver that receives an ultra wide band signal (UWB) that is an ultrabroadband signal, and to a wireless communication system equipped with the same.

BACKGROUND ART

Known receivers that receive UWB signals include a configuration illustrated in FIG. 1 which is equipped with low noise amplifier (LNA) 1301, signal generator 1007, downconversion mixer 1302, A/D converter 1303, multiplier 1304, integration circuit 1305, and sampling circuit 1306. The configuration illustrated in FIG. 1 is an example of a receiver that receives impulse-like UWB signals described in Japanese Laid-Open Patent Application No. 2004-221939A (hereinafter, referred to as Patent Document 1).

Due to the use of impulse signals, the communication band of the receiver illustrated in FIG. 1 is expanded to 500 MHz or greater. In addition, codes such as "1101 . . . " are created using an impulse with a 0 degree phase and an impulse with a 180 degree phase.

A reception signal (RF signal) inputted from an antenna is amplified by LNA 1301 and inputted to downconversion mixer 1302. Downconversion mixer 1302 uses a local (LO) signal generated by signal generator 1007 to frequency-convert a GHz-band RF signal into a baseband signal in the vicinity of DC. A/D converter 1303 converts the baseband signal into a digital signal. Multiplier 1304 multiplies a baseband digital signal, converted into a digital signal, by a template.

Integration circuit 1305 integrates a multiplication result of multiplier 1304. Sampling circuit 1306 acquires an integral value at the end of a symbol timing and outputs the same as symbol data.

Another receiver that processes broadband signals is a configuration equipped with an LNA, a switch, a capacitor, and a reset circuit described in IEEE JSSC, Vol. 39, No. 12, pp. 2278-2291, 2004 (hereinafter, referred to as Non-Patent Document 1).

With the receiver described in Non-Patent Document 1, a signal amplified by the LNA is inputted to the switch, whereby the switch performs a subsampling mixer operation where an RF signal is frequency-converted into a baseband signal. The baseband signal after frequency conversion is accumulated in the capacitor to be filtered by an FIR filter or an IIR filter that includes the capacitor. An electrical charge accumulated in the capacitor is discharged upon conclusion of filtering performed on the baseband signal.

Furthermore, a receiver equipped with an LC tank that includes an inductor and a capacitor, as well as a switch and a capacitor is described in Japanese Patent No. 3302981B (hereinafter, referred to as Patent Document 2).

According to Patent Document 2, signals are selectively passed by setting a resonant frequency of the LC tank to a vicinity of a signal frequency. The switch frequency-converts signals passed through the LC tank based on principles of the subsampling mixer described earlier, and accumulates frequency-converted signals in the capacitor.

Moreover, Japanese Laid-Open Patent Application No. 2007-097186A (hereinafter, referred to as Patent Document 3) describes a receiver equipped with an LNA, a downconversion mixer, an A/D converter, an MB-OFDM (Multi-Band Orthogonal Frequency Division Multiplexing) modem, and a DS-CDMA (Direct Spread Code Division Multiple Access) modem.

In the same manner as the receivers described in Non-Patent Document 1 and in Patent Documents 1 and 2, the receiver described in Patent Document 3 acquires a baseband digital signal from a received RF signal using the LNA, the downconversion mixer, and the A/D converter. The baseband digital signal is to be signal-processed by the MB-OFDM modem or the DS-CDMA modem. In addition, the receiver described in Patent Document 3 is equipped with a mode switch and a controller for selecting the MB-OFDM modem or the DS-CDMA modem.

However, in the background art described above, the receiver described in Patent Document 1 is configured divided according to functions such as frequency conversion by the mixer, A/D conversion, baseband processing using a digital signal (multiplication, integration), and the like. As a result, respective circuit sizes (chip areas) and power consumptions are large and this leads to a problem in which the size of the circuit and power consumption, that is needed to perform signal demodulation, are increased. In addition, the impulse-like reception signal and the template are required so as to be accurately synchronized not only in symbol-units but also in chip-units. While Patent Document 1 describes reducing the time needed for synchronous acquisition using a short code, sliding correlation processing and the like are also time-consuming, which in turn results in an increase in power consumption.

On the other hand, while Non-Patent Document 1 describes frequency conversion and filtering, no disclosures are made concerning signal demodulation. This means that a demodulating circuit is required after filtering, which leads to increases in required circuit size and power consumption.

While Patent Document 2 describes frequency selection using an LC tank and frequency conversion using a switch, in the same manner as Non-Patent Document 1, no disclosures are made concerning signal demodulation. This means that a demodulating circuit is required after frequency conversion, which leads to increases in required circuit size and power consumption.

Patent Document 3 presents a configuration divided according to functions such as frequency conversion by the mixer, A/D conversion, demodulation using a digital signal, and the like in the same manner as Patent Document 1. As a result, circuit sizes and power consumption increase.

SUMMARY

In consideration of the above, it is an object of the present invention to provide a receiver capable of reducing circuit size, cost, and power consumption required by frequency conversion and demodulation, and a wireless communication system equipped with the same.

In order to achieve the object described above, a receiver according to an aspect of the present invention includes:

an amplifier that amplifies a received broadband signal up to a predetermined level;

a first switch that switches an output signal from the amplifier;

a signal generator that generates a signal for controlling a switching operation of the first switch;

an integration capacitor that integrates an output signal from the first switch;

a comparator that compares an output voltage from the integration capacitor with a predetermined voltage; and a reset circuit that discharges electrical charges accumulated in the integration capacitor based on a comparison result from the comparator.

Meanwhile, a wireless communication system according to an aspect of the present invention includes:

a transmitter that transmits a broadband signal; and the aforementioned receiver that receives the broadband signal.

According to the present invention, a receiver that reduces circuit size, cost, and power consumption required by frequency conversion and demodulation, and a wireless communication system equipped with the same, can be obtained.

BRIEF DESCRIPTION OF THE DRAWINGS

FIG. 1 is a block diagram illustrating a configuration example of background art of a receiver that receives broadband signals.

FIG. 2 is a block diagram illustrating a configuration example of a receiver according to the present invention.

FIG. 3 is a circuit diagram illustrating a configuration of a receiver according to a first exemplary embodiment.

FIG. 4 is a circuit diagram illustrating another specific example of an LNA and a first switch included in a receiver according to the first exemplary embodiment.

FIG. 5 is a circuit diagram illustrating another specific example of an LNA included in a receiver according to the first exemplary embodiment.

FIG. 6 is a circuit diagram illustrating another specific example of an LNA and an integration capacitor included in a receiver according to the first exemplary embodiment.

FIG. 7 is a circuit diagram illustrating another specific example of an LNA included in a receiver according to the first exemplary embodiment.

FIG. 8 is a timing chart illustrating an operation example of a receiver according to the first exemplary embodiment.

FIG. 9 is a timing chart illustrating an integration operation performed by a first switch and an integration capacitor included in a receiver according to the first exemplary embodiment.

FIG. 10A is a timing chart illustrating an example of adjustment of a comparison voltage to be supplied to a comparator included in a receiver according to the first exemplary embodiment.

FIG. 10B is a timing chart illustrating an example of adjustment of a comparison voltage to be supplied to a comparator included in a receiver according to the first exemplary embodiment.

FIG. 10C is a timing chart illustrating an example of adjustment of a comparison voltage to be supplied to a comparator included in a receiver according to the first exemplary embodiment.

FIG. 11 is a schematic diagram illustrating a configuration and operations of a receiver according to a second exemplary embodiment.

FIG. 12 is a schematic diagram illustrating a configuration and operations of a receiver according to a third exemplary embodiment.

FIG. 13A is a timing chart illustrating an operation example of a receiver according to a fourth exemplary embodiment.

FIG. 13B is a timing chart illustrating an operation example of a receiver according to the fourth exemplary embodiment.

EXEMPLARY EMBODIMENT

The present invention will now be described with reference to the drawings.

(First Exemplary Embodiment)

Figure 2:
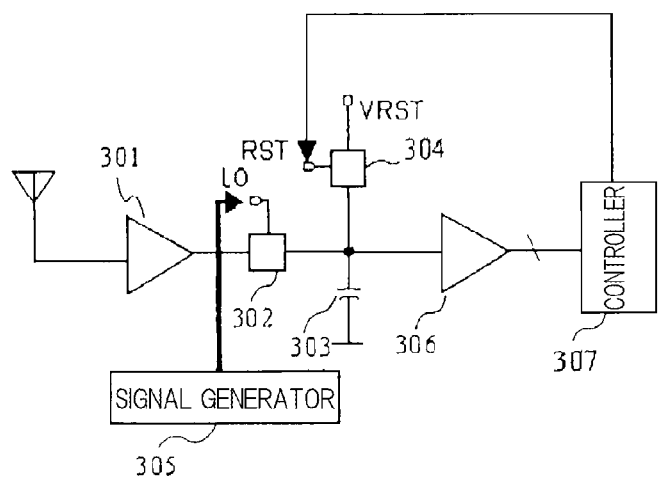
[FIG. 2]

FIG. 2 is a block diagram illustrating a configuration example of a receiver according to the present invention.

As illustrated in FIG. 2, a receiver according to the present invention is configured so as to include: low noise amplifier (LNA) 301 that amplifies a received broadband signal up to a predetermined level; first switch 302 that switches an output signal from low noise amplifier (LNA) 301; signal generator 305 that controls a switching operation of first switch 302; integration capacitor 303 that integrates an output signal from first switch 302; comparator 306 that compares an output voltage from integration capacitor 303 with a predetermined voltage; and reset circuit 304 that discharges electrical charges accumulated in integration capacitor 303 based on a comparison result from comparator 306.

Figure 3:
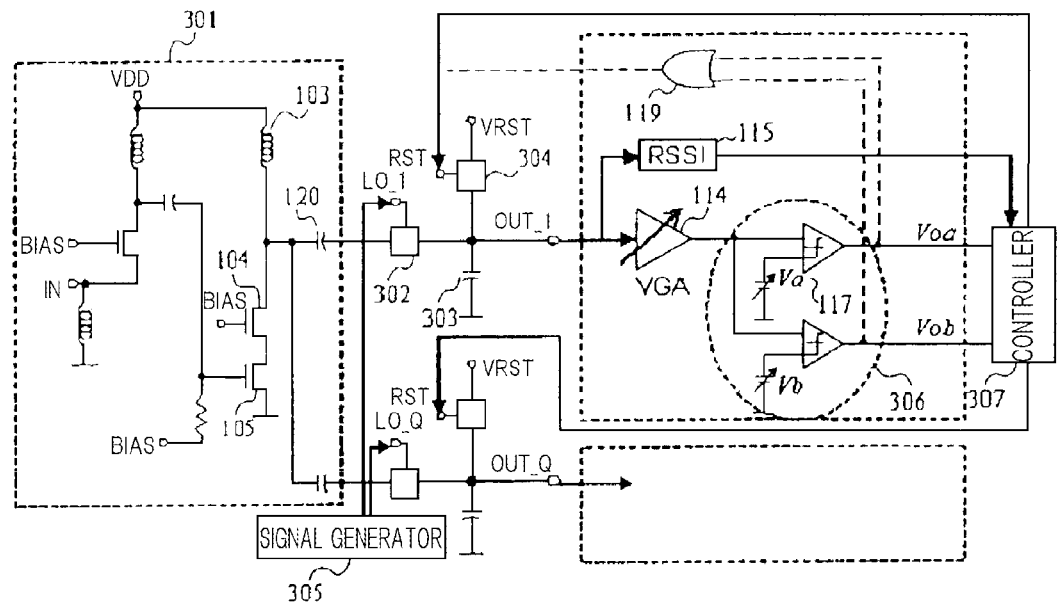
[FIG. 3]

FIG. 3 illustrates a specific example of the receiver illustrated in FIG. 2.

FIG. 3 is a circuit diagram illustrating a configuration of a receiver according to a first exemplary embodiment.

In FIG. 3, an output signal from LNA 301 is inputted to first switch 302. Here, if vi denotes a voltage inputted to LNA 301, gm a transconductance of LNA 301, and C a capacitance of capacitor 303, then an output voltage vo of capacitor 303 can be expressed as

[Expression 1].

$$vo = (\int gm \cdot vi\, dt)/C \qquad (1)$$

An integral interval ranges from time 0 to T. gm·vi denotes an output current from LNA 301 and is also an integrated current for accumulating electrical charges in integration capacitor 303.

In order to ensure that the integration operation is effectively performed on a signal, it is required that an output impedance Zout of LNA 301 take a sufficiently large value. A small Zout prevents integrated currents from being effectively accumulated in integration capacitor 303 and results in an imperfect integration, which in turn causes a drop in integral gain.

The integral interval is a period Tpulse that is a pulse length. An integral gain when integration is ideally performed is expressed as gm·Tpulse/C.

On the other hand, when resistor R exists parallel to integration capacitor 303, an integral gain due to imperfect integration is expressed as gm·R. In other words, in contrast to an ideally-obtained integral gain of gm·Tpulse/C, the integral gain drops to gm·R when resistor R is present.

For example, if the capacitance C of integration capacitor 303 is set to 1 pF and Tpulse to 2 ns, then a Tpulse/C of 2000 is obtained. However, when resistor R is around 100Ω, imperfect integration causes the integral gain to drop to approximately 1/20.

Meanwhile, the U.S. FCC (Federal Communications Commission) defines 3.1 to 10.6 GHz as an authorized band for a UWB method. However, since other countries such as Japan and European countries already use a 3.1 to 4.8 GHz frequency band that is known as a low band, these frequency bands require to be mounted with an interference avoidance technique.

With interference avoidance technology, in addition to increased cost and power consumption, interference avoidance processing is to be executed frequently when a large number of interfered wireless units exist peripherally. Therefore, there is a problem in that the communication throughput of an apparatus executing the interference avoidance processing drops significantly. In addition, with a pulse UWB method in which communication is performed using pulse signals, since an occupied band is determined by a pulse configuration (gaussian, sine, or the like) or by a pulse period or the number of waves, there is a problem in that a specific tone within the occupied band cannot be retrieved as is the case with an OFDM method. Therefore, LNA 301, first switch 302, and peripheral circuits thereof illustrated in FIG. 3 are required to be operated at 6 GHz or higher.

In order to increase the output impedance Zout of LNA 301 and obtain a high gain and low NF at 6 GHz or higher, a receiver according to the present exemplary embodiment is configured such that load inductance 103 is connected between a power supply potential and an output terminal and a cascode-structure transistor is connected between a ground potential and the output terminal of LNA 301.

The cascode structure is a configuration including transistor 105 that determines a bias current and cascode transistor 104 serially connected to transistor 105. Since the cascode structure has a large output impedance as well as the effect of reducing a Miller capacitance, the input impedance can be reduced.

The effect of being able to increase output impedance becomes particularly prominent in operations with a frequency signal of around 10 GHz using a CMOS circuit. In an operation having a frequency signal of around 10 GHz, a gate length of a transistor can be minimally designed by adopting a submicron-node CMOS process. Therefore, an extremely thin oxide film is obtained, thereby causing channel length modulation (the Early effect of a bipolar transistor) and a decrease in output resistance. Consequently, for example, with a configuration not using a cascode structure, the output impedance drops to around 100Ω. However, with a configuration using a cascode structure, the output impedance can be increased from several hundred to several KΩ.

A grounded-gate amplifier that is a precedent-stage circuit is connected to an input of transistor 105. Since the input capacitance of transistor 105 decreases due to the Miller capacitance-reducing effect, the cascode structure including cascode transistor 104 and transistor 105 illustrated in FIG. 3 can reduce the load capacitance of the precedent-stage grounded-gate amplifier. Such a reduction in load capacitance is vital to an amplifier operating at a high-frequency signal of around 10 GHz. This is due to the fact that while resonant frequency can be raised to a certain degree by reducing the load inductance of a grounded-gate amplifier, there is a fundamental problem in that gain drops as load capacitance increases.

As first switch 302, the example illustrated in FIG. 3 is equipped with I-path and Q-path switches. In other words, LNA 301 is required to drive two switches for an I-path and a Q-path. The two switches and a parasitic capacitance existing in the periphery of the switches become problematic when operated by a high-frequency signal around 10 GHz in the same manner as LNA 301. However, since load inductance 103 is capable of canceling out a capacitative reactance with an inductive reactance, impedance can be increased around a resonant frequency.

Figure 4:
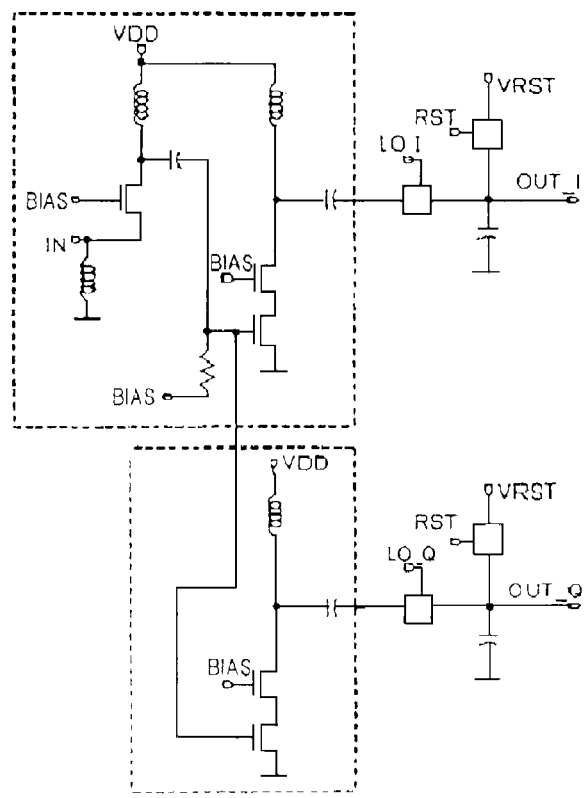
[FIG. 4]

In addition, as illustrated in FIG. 4, by respectively providing the I-path and the Q-path with dedicated LNAs instead of driving the I-path and the Q-path by one LNA 301, the load capacitance from the perspective of LNA 301 can be further reduced. In this case, LNA 301 can be configured such that the grounded-gate amplifier is shared and such that only two circuits of the last stage cascode structures are provided.

Normally, in an integration circuit, a current output amplifier is connected to a precedent stage of an integration capacitor. This is also obvious from Expression (1) provided above which represents an integration operation.

A current output amplifier is referred to as a transconductance amplifier (gm amplifier) and is configured by combining an NMOS transistor with a PMOS transistor. Normally, an integration circuit is not disposed on a pass through which a high-frequency signal of 10 GHz is passed. Instead, as described in Background Art, an integration circuit is disposed after frequency conversion. Due to the circuit configuration described above, the present exemplary embodiment is able to realize an integration circuit that operates even with a high-frequency signal of around 10 GHz.

Meanwhile, a UWB method problematically has a wide fractional band in addition to a high-frequency operation of around 10 GHz. Therefore, signals of a wide band ranging, for example, from 6 to 10 GHz are to be processed by a single circuit. In this case, since there is a 4 GHz band with 8 GHz as center, the fractional band is 50%. The US FCC (Federal Communications Commission) defines a UWB method as wireless communication using a bandwidth whose 10 dB-fractional bandwidth equals or exceeds 20% or 500 MHz of a center frequency. Accordingly, the fractional band is to be at least 20% or greater.

Figure 5:
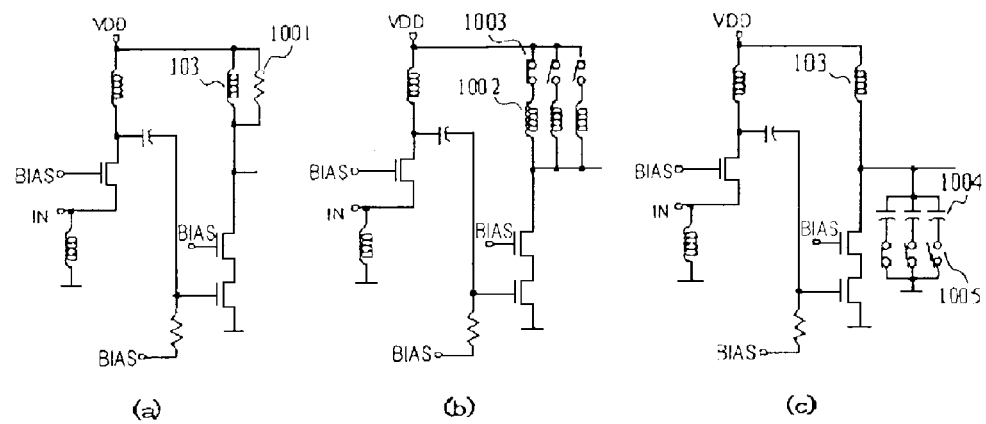
[FIG. 5]

The fractional band of normal narrowband wireless communication such as a wireless LAN is around 1%, which suggests that the fractional band of a UWB method is significantly wide. In particular, a wide fractional band creates a problem in which an in-band deviation occurs in circuits such as amplifiers that operate in a wide band. While there are cases where a circuit such as that illustrated in FIG. 3 can cope with such a problem if the fractional band is around 20%, a fractional band of around 50% requires that some measures be taken. FIG. 5(a) illustrates a configuration example in which resistor 1001 is provided parallel to load inductance 103 in order to cope with such a problem.

While the integral gain of the circuit illustrated in FIG. 5(a) drops by providing resistor 1001, there may be cases where the circuit can be used without incident depending on the minimum receiver sensitivity required by a specification of a wireless communication system or on a required C/N value. The same effect can be achieved by reducing Q of load inductance 103.

FIG. 5(b) is a configuration equipped with a plurality of load inductances 1002, whereby load inductances 1002 are switched depending on the used frequency band. By switching load inductances 1002, resonant frequencies can be switched. In this case, a frequency band is to be judged by controller 307 that executes digital baseband processing, and load inductance 1002 is to be selected depending on the selected frequency band. While FIG. 5(b) illustrates an example in which switch 1003 for switching load inductances 1002 is serially connected to a power supply voltage-side of load inductance 1002, switch 1003 may alternatively be serially connected to an output terminal-side of load inductance 1002.

FIG. 5(c) is a configuration equipped with a plurality of capacitors 1004, whereby a resonant frequency is changed by switching capacitors 1004 depending on the used frequency band.

In the configuration illustrated in FIG. 5(c), in a similar manner as the configuration illustrated in FIG. 5(b), the frequency band is to be judged by controller 307 and capacitor 1004 is to be selected depending on the selected frequency band. While FIG. 5(c) illustrates an example in which switch 1005 for switching capacitors 1004 is serially connected to a ground potential-side of capacitor 1004, switch 1005 may alternatively be serially connected to an output terminal-side of capacitor 1004.

A control signal generated by signal generator 305 is inputted to the control terminal of first switch 302. In this case, there is a phase difference of 90 degrees between control signals inputted to I-path and Q-path first switches 302.

Integration capacitor 303 and reset switch 304 are connected to an output of first switch 302. Parasitic resistances residing in first switch 302 and integration capacitor 303 are desirably minimal.

Signal power decreases when a cutoff frequency determined by integration capacitor 303 and a parasitic resistance value is lower than a signal frequency. In other words, a reduction in gain occurs. For example, in a case of a parasitic resistance of around 10Ω and integration capacitor 303 with a capacitance of 1 pF, the cutoff frequency is approximately 16 GHz. Therefore, an operation with a high-frequency signal of around 10 GHz can be performed without incident. However, when a parasitic resistance is increased to around 100Ω, the cutoff frequency drops to approximately 1.6 GHz. Therefore, the power of a signal of around 10 GHz drops to approximately $\frac{1}{10}$. Consequently, an operation by a high-frequency signal of around 10 GHz requires that the parasitic resistance of integration capacitor 303 be smaller than around 10Ω. As such, integration capacitor 303 desirably has an MIM (metal-insulator-metal) structure. In addition, while dependent on operating points, a configuration that combines an NMOS transistor and a PMOS transistor is preferably used as first switch 302. However, such a configuration has a risk of increasing parasitic capacitance. Therefore, in a preferred configuration, first switch 302 includes a single NMOS transistor, and DC block capacitor 120 is disposed between the final stage of LNA 301 and the input terminal of integration capacitor 303. In this case, since setting reset voltage VRST 110 near 0 V brings the operating point of first switch 302 close to 0 V, operations can be performed without incident even when first switch 302 is configured with a single NMOS transistor.

In addition, the parasitic resistance of reset switch 304 illustrated in FIG. 3 also needs to be reduced. This is because if R denotes the parasitic resistance of reset switch 304 and C denotes the capacitance of integration capacitor 303, then a time constant during discharge of electrical charges accumulated in integration capacitor 303 is determined by the parasitic resistance R and the capacitance C. For example, when operating with a high-frequency signal of around 8 GHz, a discharge of integration capacitor 303 is preferably completed within a period of time equal to or less than half of 125 ps that is one 8 GHz cycle, and the parasitic resistance R is preferably set to 50Ω or less and the time constant to 50 ps or less.

Since it is required that reset switch 304 be such a small parasitic resistance, reset switch 304 is preferably configured by a single NMOS transistor as was the case with first switch 302, and the operating point be preferably set to a low voltage. However, unlike first switch 302, the parasitic capacitance of reset switch 304 does not pose that much of a problem. Therefore, a configuration that combines an NMOS transistor and a PMOS transistor can also be used as reset switch 304.

As described above, while the transconductance gm of LNA 301 and the capacitance value C of integration capacitor 303 determines the integral gain of an integration circuit, the integral gain may be made variable by switching the values of gm of LNA 301 or C. LNA 301 illustrated in FIG. 6 enables a bias voltage Vd of a transistor to be varied so as to switch the transconductance gm of LNA 301.

Figure 6:
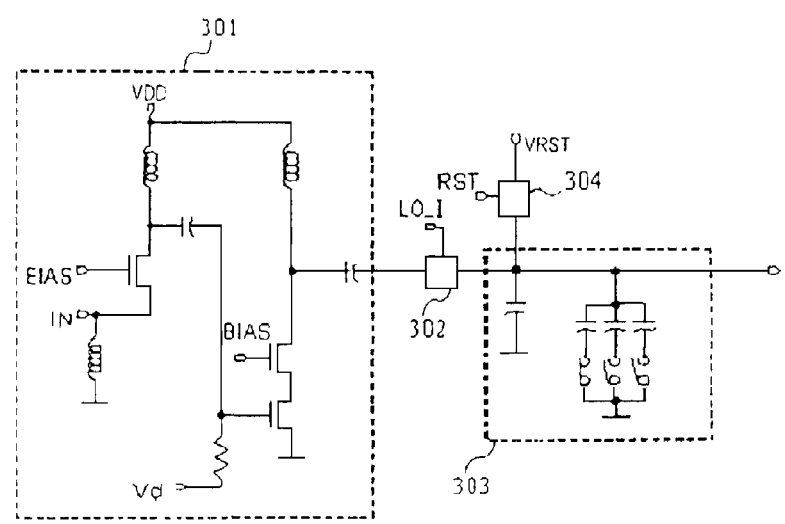
[FIG. 6]

In addition, integration capacitor 303 illustrated in FIG. 6 includes, for example, a plurality of capacitor elements connected in parallel and having different capacitance values (in a binary relationship), whereby a switch is connected to each capacitor element so as to enable switching of the capacitance value of integration capacitor 303.

Received power at an end of an antenna included in the receiver varies between, for example, about −80 to −20 dBm depending on the distance between a transmitter and a receiver. Therefore, depending on integral gain, the output voltage of integration capacitor 303 may reach saturation. In such a case, a variable gain mechanism such as that illustrated in FIG. 6 becomes necessary.

Variable gain amplifier 114 amplifies the output voltage of integration capacitor 303 until reaching a level where the output voltage can be judged by comparator 306. Variable gain amplifier 114 can be omitted depending on integral gain or a minimum voltage identifiable by comparator 306.

Since the integration circuit includes no active elements other than LNA 301, a low-noise circuit can be readily configured. However, when variable gain amplifier 114 is required, an NF (noise factor) thereof needs to be reduced. Variable gain amplifier 114 requires an operating band of around 500 MHz that is determined by Tpulse (e.g., 2 ns) to be described later. Variable gain amplifier 114 may be provided with, for example, lowpass filter characteristics so as to reduce erroneous operations due to noise during judgment processing by comparator 306.

Received signal strength indicator (RSSI) 115 is provided for determining a gain or an integral gain of variable gain amplifier 114. A gain of the integration circuit including variable gain amplifier 114 and integration capacitor 303 may be directly changed using an output signal of RSSI 115 or can also be controlled by controller 307 based on an output signal of RSSI 115.

In the example illustrated in FIG. 3, comparator 306 includes two comparator elements 117. Comparison voltage Va and comparison voltage Vb which are reference voltages to be used for comparisons with the output voltage of integration capacitor 303 are inputted to comparator elements 117 from a voltage supply. The respective comparison voltages are to be used as an upper judgment value and a lower judgment value of a signal. The comparison voltages are preferably generated by a D/A converter so as to be variable. In this case, the values of the comparison voltage Va and the comparison voltage Vb generated by the voltage supply are to be controlled by controller 307 based on an output result of comparator 306 or an output voltage of RSSI 115.

In FIG. 3, comparator 306 becomes capable of detecting a desired wave in a signal when configured with even more comparator elements 117. In addition, the same effect can be achieved by configuring comparator 306 with a multi-bit A/D converter. The use of these components involves a tradeoff between power consumption and circuit size (chip area), and a detection speed and accuracy of a desired wave.

In the example illustrated in FIG. 3, the output of comparator 306 is connected to controller 307. Controller 307 controls reset switch 304 so as to discharge (reset) electrical charges accumulated in integration capacitor 303. As an alternative path, reset switch 304 can be controlled with a logical add (OR) of output signals of two comparator elements 117 included in comparator 306 by using OR circuit 119 as depicted by the dashed line. Controller 307 can be realized by combining a driver circuit for driving switches and the like, a CPU, a DSP, or various logic circuits which operate according to a program.

Figure 7:
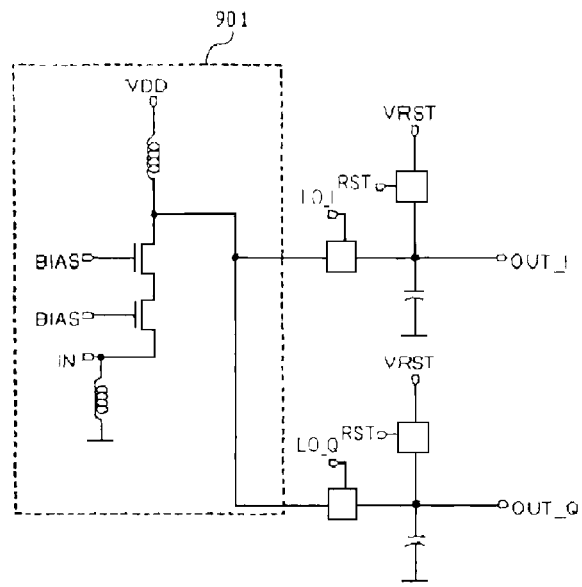
[FIG. 7]

FIG. 7 is a configuration example in which single-gate grounded-gate amplifier 901 is used as LNA 301, whereby first switch 302 is driven by grounded-gate amplifier 901.

The circuit illustrated in FIG. 7 is configured so as to adopt a cascode structure while including a load inductance in order to increase integral gain and increase output impedance with respect to signals around 10 GHz. The circuit illustrated in FIG. 7 does not require a particularly large gain and can be used when a reduction in power consumption or circuit size is desired.

Next, operations of a receiver according to the present exemplary embodiment will be described using FIG. 8 with reference to FIG. 3.

Figure 8:
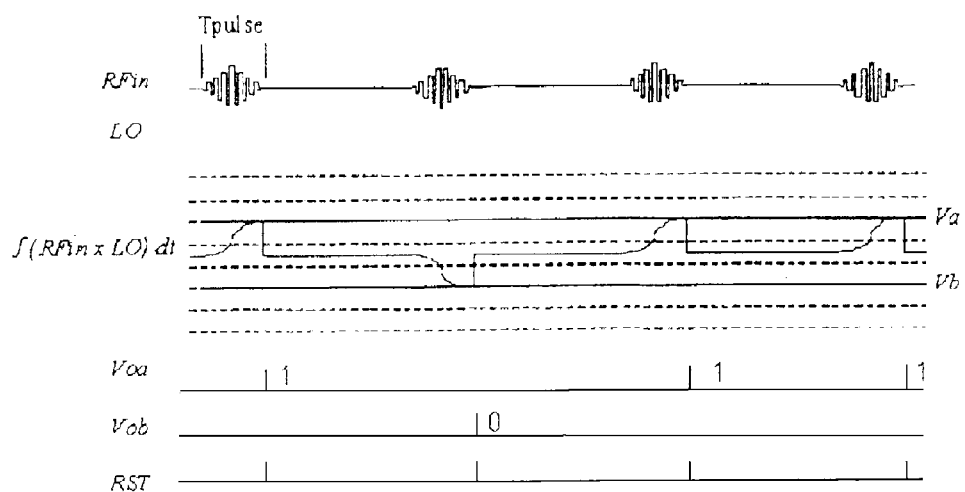
[FIG. 8]

FIG. 8 is a timing chart illustrating an operation example of a receiver according to the first exemplary embodiment.

Reference character RFin in FIG. 8 denotes an example of a UWB signal to be inputted to LNA 301. In addition, reference character Tpulse denotes a length of a pulse-like UWB signal and determines the occupied bandwidth of the UWB signal. As described earlier, since the UWB signal needs to be dispersed at a bandwidth of 500 MHz or wider, Tpulse takes a value of, for example, around 2 ns or less. While bandwidth is expanded by reducing Tpulse, a wide band is occupied which reduces the number of channels and, in turn, limits the number of terminals capable of communication. If f denotes pulse signal frequency (carrier frequency) and n denotes the number of waves of a pulse, then Tpulse can be expressed as Tpulse=n/f. In addition, occupied bandwidth BW can be expressed as BW=1/Tpulse. For example, if carrier frequency (center frequency) is 8 GHz and Tpulse is 2 ns, then the number of waves n is around 16.

While communication systems whose number of waves n is around 1 may sometimes be referred to as an impulse radio (IR), the effects of the present invention is not diminished by the magnitude of n. As such, in the present specification, communication systems including those with small n will be referred to as pulse UWB or pulse radio.

In a pulse cluster (Tpulse period) including n number of waves, a pulse signal includes a predetermined envelope. The envelope corresponds to a window function in FFT (Fast Fourier Transform) and affects frequency characteristics in an occupied band, spurious characteristics in bands outside of the occupied band, and the like.

Pulse UWB signal RFin illustrated in FIG. 8 includes a triangular wave-like envelope. A triangular wave-like envelope is preferable in that the circuit size and power consumption required to generate an envelope can be reduced and that both in-band and out-of-band characteristics are relatively favorable.

An LO signal is inputted via the control terminal to first switch 302. Here, a pulse with a duty ratio of approximately 50% is used as the LO signal.

The input signal RFin is amplified at LNA 301 and inputted to first switch 302. LO signal 202 whose frequency is equal to a carrier frequency of the input signal RFin is inputted to first switch 302 from control terminal 107. First switch 302 multiplies the input signal RFin by the LO signal and, at the same time, supplies an integrated current to integration capacitor 303. An integrated voltage $\int (RFin \times LO) dt$ appears in integration capacitor 303.

Figure 9:
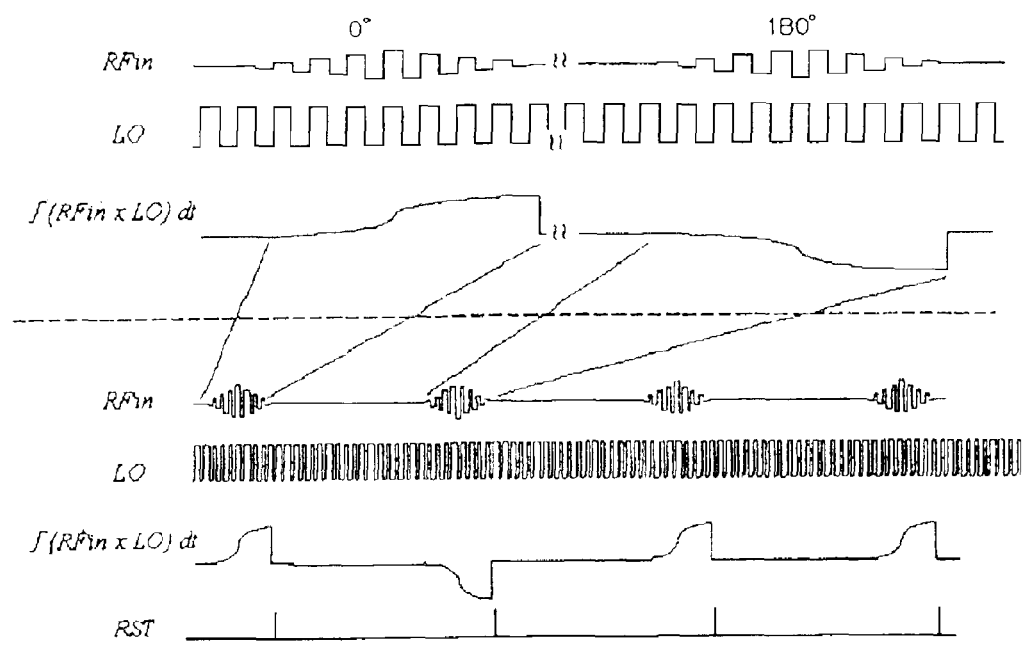
[FIG. 9]

FIG. 9 illustrates an integral operation by first switch 302 and integration capacitor 303 expanded in the direction of a temporal axis.

The input signal RFin is assumed to be a BPSK-modulated signal. The phase of a BPSK-modulated signal alternates between 0 degrees and 180 degrees. Due to multiplication by first switch 302, the integrated voltage rises in a positive direction during a period where the phase is 0 degrees and drops in a negative direction during a period where the phase is 180 degrees.

The integrated voltage of integration capacitor 303 is amplified by variable gain amplifier 114 and inputted to comparator 306. Comparator 306 includes, for example, binary comparison voltages Va and Vb, and uses comparison voltage Va to detect a positive correlation with a signal that is a comparison object and uses comparison voltage Vb to detect a negative correlation with a signal that is a comparison object. Positive and negative correlations respectively correspond to 0 degree and 180 degree phases of the BPSK-modulated signal.

BPSK modulation is known to utilize codes such as PN (pseudorandom noise) sequences. For example, an "1011" code is used in the example illustrated in FIG. 3, where code "1" corresponds to a 0 degree-phase and code "0" to an 180 degree-phase. By using a long PN sequence, erroneous judgment due to noise, interference, and the like can be reduced.

A signal Voa and a signal Vob are outputted from two comparator elements 117 included in comparator 306. The signal Voa is activated during a period where the phase of the input signal RFin is 0 degrees, while the signal Vob is activated during a period where the phase of the input signal RFin is 180 degrees.

The signal Voa and the signal Vob are inputted to controller 307 or OR circuit 119 and after being subjected to logical add processing and the like, supplied as an RST signal to reset switch 304.

Integration capacitor 303 discharges electrical charges accumulated through operations of reset switch 304. At the same time, the active states of the signals Voa and Vob outputted from comparator 306 are released.

With a BPSK signal, it is impossible to determine whether power is present in the I-path or the Q-path. Furthermore, even if such determination can be made, distribute power to any one of the paths cannot be controlled unless a PLO (phase lock oscillator) that generates LO signals is equipped with a phase-adjusting function. The receiver illustrated in FIG. 3 is equipped with an I-path and a Q-path and performs correlation detection even using a Q-path output signal. With such a configuration, there may be cases where a correlation output appears only in the I-path, cases where a correlation output appears only in the Q-path, and cases where a correlation output appears in both paths.

An S/N of a reception signal can be maximized using the concept of Maximal-Ratio Combining (MRC) by assigning a greater weight to whichever signal having the higher S/N among the two path signals and then combining the signals.

Controller 307 performs such a computation to control correlation output and reset switch 304.

Heretofore, while an example in which an input signal RFin is subjected to BPSK modulation has been described in the present exemplary embodiment, the input signal RFin may be subjected to PPM (pulse position modulation) or QPSK modulation, or may take the form of a modulation signal that combines these modulations.

In the case of PPM modulation, pulse positions vary. While pulse clusters are arranged in regular intervals in FIG. 8, a PPM-modulated signal is a signal in which pulse clusters are displaced from the regular interval positions by a predetermined period of time. In BPSK modulation, an inverse PRF (pulse repetition frequency) of the regular time intervals (chip periods) are set so as to range from about 8 to 60 MHz. Pulse displacements are set to about 2 ns.

QPSK modulation requires that synchronization be achieved at the beginning. Thus, BPSK modulation or PPM modulation is to be performed during a preamble period in which synchronization is achieved, and after achieving synchronization, a transition is made to QPSK modulation. In this case, a DLL (delay lock loop) or the like is preferably used which controls frequencies and phases while retaining synchronization so as to prevent mixing of I-path and Q-path signals.

Figure 10A:
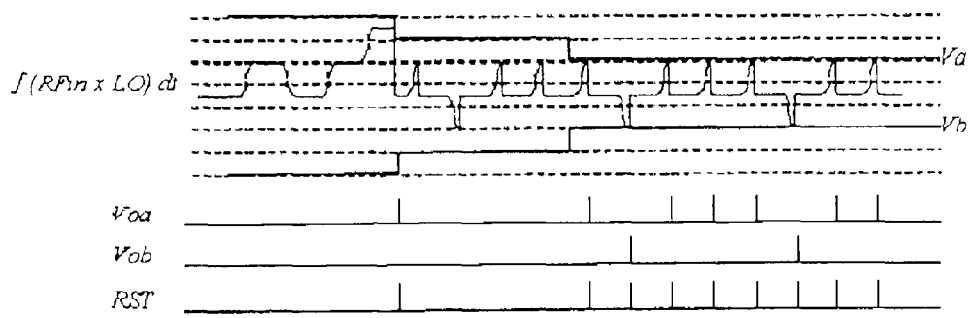
[FIG. 10A]
Figure 10B:
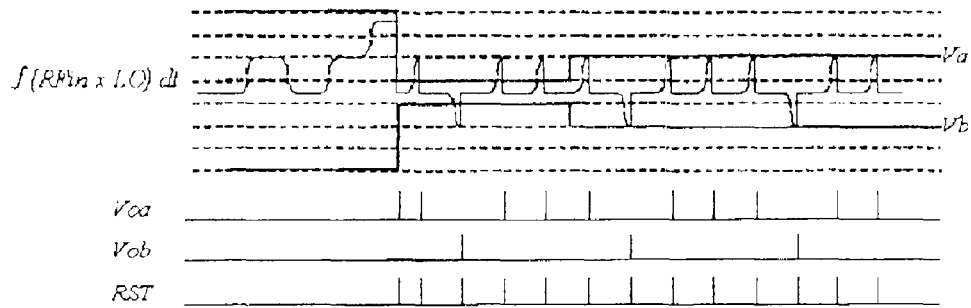
[FIG. 10B]

Comparator 306 requires that the comparison voltages Va and Vb be set such that an integrated voltage outputted from integration capacitor 303 crosses the comparison voltages at the greatest possible value. Therefore, the comparator is preferably equipped with a voltage supply that supplies a comparison voltage Va for detecting a positive correlation with a broadband signal and a comparison voltage Vb for detecting a negative correlation with a broadband signal, whereby the comparison voltage Va and the comparison voltage Vb are controlled by, for example, controller 307 so as to become narrower in stages as illustrated in FIG. 10A. Alternatively, as illustrated in FIG. 10B, optimal comparison voltages Va and Vb may be searched according to a known binary search method. Yet alternatively, as illustrated in FIG. 10C, by configuring comparator 306 so as to include three or more comparator elements (multi-bit comparator), a correlation output can be obtained from an output of comparator 306 without having to search for comparison voltages.

As described above, an integrated voltage to be inputted to comparator 306 needs to be amplified using RSSI 115 or the like up to a comparable value before determining an optimum comparison voltage. An integral gain and variable gain amplifier 114 are to be adjusted by controller 307. Controller 307 sets an appropriate gain so as to prevent the integrated voltage that is inputted to comparator 306 from becoming buried in noise or to prevent a signal from being saturated at comparator 306 or at a precedent-stage circuit thereof.

In addition, controller 307 sets the comparison voltage Va and the comparison voltage Vb so as to become narrower in stages as illustrated in FIG. 10A. When the comparison voltages Va and Vb are narrowed down in stages in this manner, a retention period of one stage is preferably equal to or longer than a symbol length period. In the examples illustrated in FIGS. 10A to 10C in which one symbol includes four chips, assuming that the length of one chip is 30 ns, then a comparison voltage is retained at each stage for a period of time equal to or longer than 120 ns. Accordingly, a symbol can be detected and an optimum comparison voltage can be set. In the method of searching a comparison voltage illustrated in FIG. 10B, the retention periods for the comparison voltages Va and Vb in each stage are to be set in the same manner as described above.

Figure 10C:
[FIG. 10C]

With the configuration using the multi-bit comparator illustrated in FIG. 10C, a correlation output is obtained at any one of the comparators. In the example illustrated in FIG. 10C, correlations are outputted at Voc and Vod. While an example using four comparators is illustrated in FIG. 10C, a larger number of comparator can also be used. In such a case, correlation outputs may be obtained from a plurality of comparators. When correlation outputs are obtained from a plurality of comparators, controller 307 preferably judges a comparator stably outputting a correlation output and determines a correlation output that is to be used for setting a gain and the like. This is because the influence of noise is likely when the comparison voltages Va and Vb are low, while comparison voltages are likely to be present in the vicinity of an integrated voltage saturation value when the comparison voltages are high.

When a signal level can be determined by RSSI 115 or the like, the number of comparison voltage-setting stages need not be set too high. Since the greater the number of stages, the longer it takes to perform synchronization detection, it is preferable that a favorable result be obtained when the number of stages ranges between 2 to 8. In this case, according to the method of searching a comparison voltage illustrated in FIG. 10B, an optimum comparison voltage can be obtained within four stages.

As described above, with a receiver according to the first exemplary embodiment, since frequency conversion, quantization, and demodulation can be performed using first switch 302, integration capacitor 303, and comparator 306, circuit downsizing and a reduction in power consumption can be achieved.

With a receiver that receives a ultrabroadband signal according to background art, frequency conversion is performed using a mixer, the signal is converted into a baseband signal and then subjected to A/D conversion and quantization, and demodulation is then performed using a digital signal. Therefore, downsizing and a reduction in power consumption of a receiver circuit cannot be realized in pulse radio communication that have low communication rates. Conversely, these objectives can be achieved with the present invention.

Figure 1:
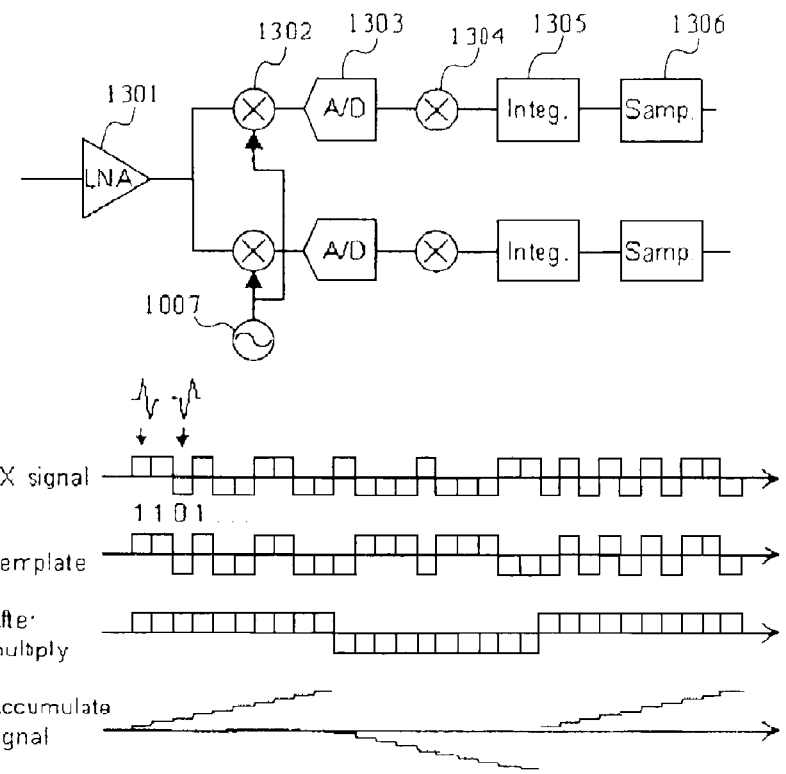
[FIG. 1]

With the background art illustrated in FIG. 1, when obtaining a correlation between a reception signal and a template, a correlation is not outputted unless consistency is precisely attained down to symbol codes. This is because correlation is attained in symbol units. In this case, the temporal difference between a reception signal and a template is shifted using a sliding correlator or the like until correlation is obtained in symbol units, whereby it is required that a given fraction of a chip period be set as a time-step for shifting. This is done because correlation output cannot be increased unless the reception signal and the template are consistent in chip units.

For example, when a sliding correlation method with an 8-bit PN symbol code is executed in ⅓ chip period-units, maximum 24-bit shifting processes are required until a correlation output is obtained. In this case, the longer a bit length of the PN code, the greater is the time and power consumption required by synchronous acquisition, in direct proportion.

On the other hand, in the present exemplary embodiment, correlation output can be obtained in chip units. The correlation in this case is not a PN code correlation but a correlation with respect to a carrier frequency and a phase thereof. In addition, a correlation output is obtained due to the integral operation of an integration circuit. Furthermore, when a chip-unit correlation is obtained, a symbol output appears in a comparator output. PN code correlation judgment can be performed by inputting the symbol output into a matched-filter circuit or the like.

Moreover, in the present exemplary embodiment, owing to multiplication and integration operations in an RF range and to a subsequent comparator, a correlation can be obtained from a chip to a symbol by merely performing several raising and dropping operations of the comparison voltage of a comparator even if a sliding correlation method at time-steps of a fraction of chip units is not executed. Alternatively, a correlation output can be immediately obtained by using a multibit comparator. Therefore, with a receiver according to the present exemplary embodiment, the period of time required by synchronous acquisition can be reduced.

In recent years, standardization of pulse radio transmission methods is being promoted as IEEE 802.15.4a. As a result, PAN (Personal Area Network) wireless communication which communicates at a relatively low rate ranging from 0.1 Mbps to 24 Mbs is in the process of being realized.

With a receiver according to the present exemplary embodiment, first switch 302, integration capacitor 303, reset circuit 304, and comparator 306 perform frequency conversion, quantization, and demodulation collectively. In other words, results of frequency conversion are accumulated as electrical charges in integration capacitor 303, and at the same time, correlation amounts reflecting phase information of 0 degrees or 180 degrees of a pulse UWB signal are also accumulated therein as electrical charges.

With such a configuration, correlation amounts are to be accumulated in integration capacitor 303 without having to perform sliding correlation and a positive/negative judgment of correlation can be performed by comparator 306.

Therefore, since frequency conversion and demodulation can be executed with one circuit, a receiver featuring a small circuit size (small chip area), low cost, and low power consumption can be obtained.

In addition, accumulation of correlation amounts by integration capacitor 303 and positive/negative judgment of correlation by comparator 306 eliminate the need of sliding correlation processing and enable reductions in circuit size and power consumption as well as the period of time required for synchronous acquisition.

(Second Exemplary Embodiment)

Next, a second exemplary embodiment will be described with reference to the drawings.

Figure 11:
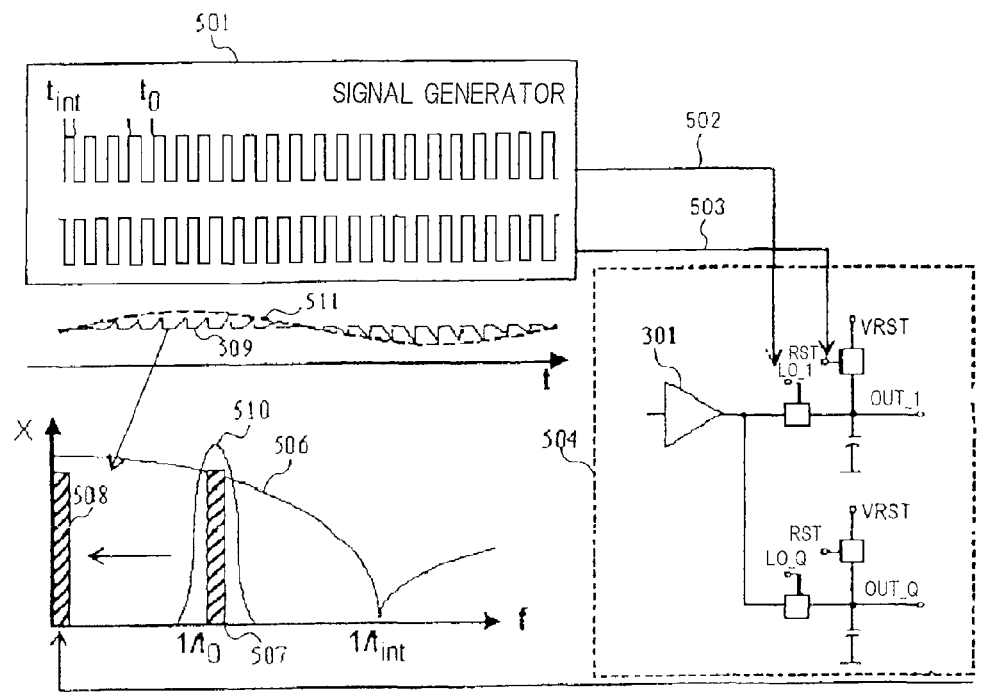
[FIG. 11]

FIG. 11 is a schematic diagram illustrating a configuration and operations of a receiver according to the second exemplary embodiment.

FIG. 11 illustrates, without modification, primary sections of the first exemplary embodiment. A receiver according to the second exemplary embodiment is configured so as to perform frequency conversion on an MB-OFDM signal.

An MB-OFDM signal features a fractional band of 20% or greater and a band of 500 MHz or greater as defined by the UWB method, and also includes characteristics of an OFDM (orthogonal frequency multiplexing) method.

The MB-OFDM method has an OFDM bandwidth of approximately 500 MHz, and also includes characteristics of fast frequency hopping in which frequency bands are switched at a high speed of approximately 10 ns. In addition, the MB-OFDM method has a characteristic of performing frequency hopping among three bands each having a bandwidth of approximately 500 MHz and communicating using a frequency of approximately 1.5 GHz.

As illustrated in FIG. 11, a receiver according to the second exemplary embodiment is configured so as to include front end section 504 that is equipped with LNA 301, first switch 302, integration capacitor 303, and reset switch 304.

With the receiver according to the second exemplary embodiment, electrical charges accumulated in integration capacitor 303 are discharged at regular time intervals instead of by a reset operation by reset circuit 304 based on a comparison result of comparator 306. In other words, an LO signal generated by signal generator 501 is inputted as a reset signal RST to a control terminal of first switch 302. In the same manner as in the first exemplary embodiment, the LO signal is a pulse sequence equal to a carrier frequency of an MB-OFDM signal and whose duty is approximately 50%.

Signal generator 501 generates the reset signal RST and supplies the same to reset circuit 304. Reset signal 503 is a signal with the same frequency and a phase that is approximately 180 degrees out of phase with respect to LO signal 502. Reset signal 503 may be generated by an individual signal generator that differs from signal generator 501 that generates LO signal 502.

Accordingly, a received MB-OFDM signal is frequency-converted into a baseband frequency and subjected to integration by first switch 302, and accumulated in integration capacitor 303. In this case, an integral period tint is equal to half the period of the LO signal.

FIG. 11 illustrates frequency conversion and an integral operation by first switch 302 and integration capacitor 303. Reference numeral 507 in FIG. 11 denotes an MB-OFDM signal, 508 denotes a baseband signal frequency-converted to near DC, and 506 denotes transfer function characteristics in the integration operation. Transfer function 506 is a sinc function having a null point at 1/tint.

Transfer function characteristic 506 reduces high-pass noise and provides an antialiasing effect during sampling. In other words, first switch 302, capacitor 303, and reset circuit 304 function as a frequency conversion circuit equipped with an antialiasing function. LNA 301 has resonance characteristics 510 due to a resonant circuit configured by load inductance 103 or a resonant circuit that includes a load inductance of a grounded-gate amplifier installed in a precedent stage of load inductance 103. The resonance characteristics of LNA 301 also include an effect of preventing passage of high-pass noise due to folding characteristics.

Waveform 509 depicted by a solid line in FIG. 11 represents, on a temporal axis, an integrated voltage outputted from an integration capacitor. Since envelope 511 of waveform 509 indicates a baseband signal, a baseband signal can be obtained by performing filtering that retrieves only signals in the baseband.

(Third Exemplary Embodiment)

Figure 12:
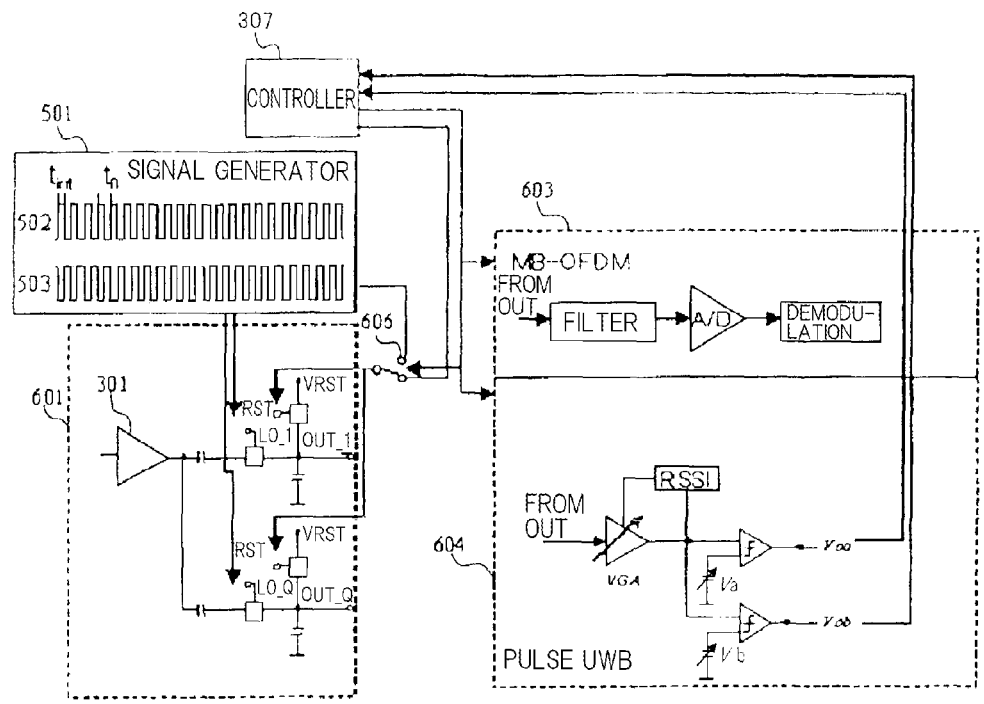
[FIG. 12]

FIG. 12 is a schematic diagram illustrating a configuration and operations of a receiver according to a third exemplary embodiment.

FIG. 12 illustrates, without modification, primary sections of the first exemplary embodiment. The receiver according to the third exemplary embodiment is an example that realizes an ultrabroadband receiver capable of processing both pulse UWB signals and MB-OFDM signals.

As illustrated in FIG. 12, the receiver according to the third exemplary embodiment is configured so as to include front end section 601 that is equipped with LNA 301, first switch 302, integration capacitor 303, and reset switch 304.

In the same manner as in the second exemplary embodiment, LO signal 502 generated by signal generator 501 is inputted to a control terminal of first switch 302. Signal generator 501 further generates reset signal 503 in the same manner as in the second exemplary embodiment.

Upon receiving an MB-OFDM signal, second switch 606 selects reset signal 503 and supplies the same to reset switch 304.

Controller 307 controls operations of second switch 606, and at the same time, activates MB-OFDM circuit block 603 necessary for demodulation of the MB-OFDM signal. MB-OFDM circuit block 603 is equipped with a filter, an A/D converter, a demodulating circuit, and the like.

Based on respective superframes to be described later, controller 307 determines whether the receiver is receiving an MB-OFDM signal or a pulse UWB signal and performs control accordingly.

When receiving a pulse UWB signal, second switch 606 selects a signal from controller 307 or OR circuit 119 having acquired a comparison result of comparator 306, and supplies a reset signal to the control terminal of reset switch 304. The reset operation at this point is the same as that of the first exemplary embodiment.

Controller 307 activates pulse UWB circuit block 604 necessary for demodulation of the pulse UWB signal. Pulse UWB circuit block 604 is equipped with variable gain amplifier 114 and comparator 306.

(Fourth Exemplary Embodiment)

Figure 13A:
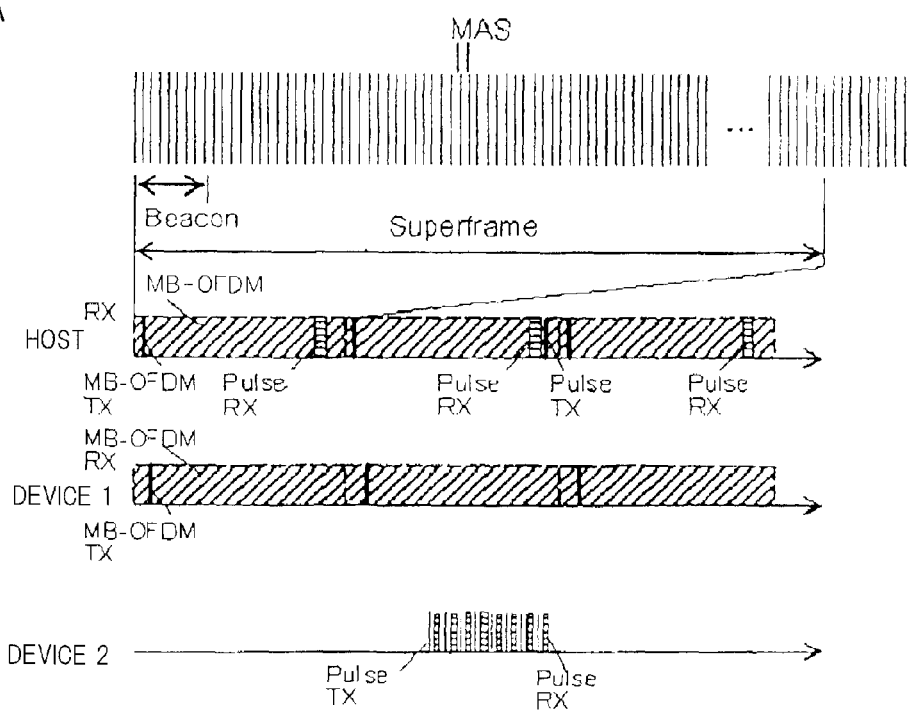
[FIG. 13A]
Figure 13B:
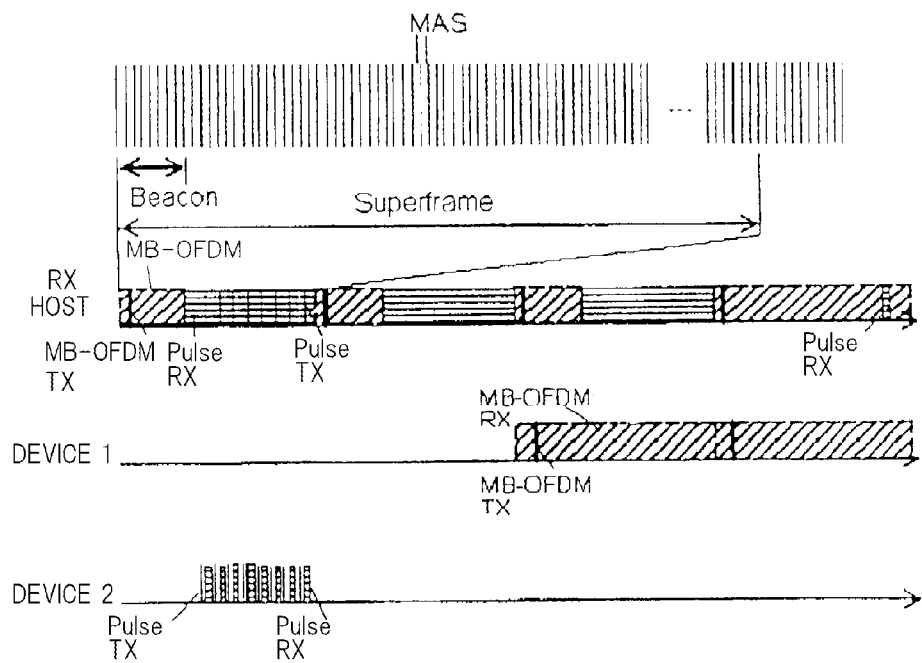
[FIG. 13B]

FIGS. 13A and 13B are timing charts illustrating an operation example of a receiver according to a fourth exemplary embodiment.

A receiver according to the fourth exemplary embodiment is configured so as to receive, as appropriate, an MB-OFDM signal and a pulse UWB signal. Since the configuration of the receiver is similar to that of the third configuration example, a description thereof will be omitted.

Generally, while MB-OFDM communication enables communication between several hundred Mbps to several Gbps, power consumption problematically increases. On the other hand, while a pulse UWB method realizes low-rate communication up to around 24 Mbps, power consumption is relatively low. Communication with even lower power consumption can be performed by further applying the present invention.

In the MB-OFDM method, a beacon group (piconet) is formed using superframes. A superframe is a frame to which a period of time of around 65 ms is allocated, and includes a beacon period to be used to discern a terminal participating in the beacon group.

A participating terminal transmits a beacon signal (beacon) during a beacon period. In addition, the participating terminal can make a transition into a sleep state (sleep mode) by declaring a desired sleep period.

While a method of switching between communication by the MB-OFDM method and communication by the pulse UWB method has not yet been proposed, the two communication methods can be switched using a method such as described below.

As illustrated in FIG. 13A, first, let us assume that a host terminal including the receiver described in the third exemplary embodiment and a transmitter that transmits broadband signals is participating in a beacon group. In this case, the host terminal is assumed to be a host of the beacon group. In the MB-OFDM method, a terminal participating in the beacon group sequentially transmits beacon signals during a superframe beacon period. By transmitting the beacon signals, the participating terminal becomes capable of transmitting/receiving information in synchronization with a superframe.

A superframe is configured by a plurality of (around 256) MASs (Media Access Slots). Each user transmits/receives information using the plurality of MASs.

The host terminal illustrated in FIG. 13A basically receives an MB-OFDM signal (MB-OFDM RX) and transmits a beacon signal during a beacon period. In addition, the host terminal receives a pulse UWB signal (Pulse RX) during a MAS period allocated to each user. By including a receiver shown in the third exemplary embodiment, the host terminal can realize such functions. In addition, when a call is made from another terminal or device upon reception of a pulse UWB signal, the host terminal transmits the pulse UWB signal (Pulse TX), returns an ACK (response), and transmits information.

Device 1 illustrated in FIG. 13A is participating in a beacon group and basically receives MB-OFDM signals (MB-OFDM RX). In addition, device 1 transmits a beacon signal during a beacon period. Device 1 can be arranged so as to accommodate both the MB-OFDM method and the pulse UWB method by including a transmitter that transmits a broadband signal and the receiver described in the third exemplary embodiment, and can be arranged so as to accommodate only the MB-OFDM method by including the receiver described in the second exemplary embodiment.

For example, a high-speed terminal and the like that perform high-definition transmission to an audio-visual device that is supplied power from an AC supply and which has few limitations on power consumption can be configured so as to include the receiver described in the second exemplary embodiment.

While device 2 illustrated in FIG. 13A maintains a sleep state in which basically no transmission and reception are performed, device 2 is activated (wakeup activation) when transmitting information to the host terminal or a server and the like. Information is transmitted by a pulse radio transmission method. Transmission by the pulse radio transmission method (Pulse TX) and reception by the pulse radio transmission method (Pulse RX) for confirming the presence/absence of an ACK or the like is repetitively performed until a response arrives from another station.

As described above, the host terminal periodically performs reception by the pulse radio transmission method within a superframe and is capable of detecting a transmission from device 2 by the pulse radio transmission method (in this case, the second superframe). The host terminal performs transmission by the pulse radio transmission method to notify device 2 that the transmission by the pulse radio transmission method therefrom has been detected. Once a signal by the pulse radio transmission method transmitted from the host terminal is received, device 2 can exchange information with the host terminal.

While device 2 may be configured so as to include a transmitter that transmits a broadband signal and the receiver described in the third exemplary embodiment, an alternative configuration may be adopted in which device 2 is equipped with the receiver described in the first exemplary embodiment which receives pulse UWB signals. For example, let us assume that device 2 is a security sensor that operates on a battery such as a small button cell or the like and is a device that activates a radio circuit from a sleep state upon detecting an intrusion by a suspicious party and transmits the detection of an intruder to the host terminal. In this case, device 2 terminates communication upon receiving an ACK returned from the host terminal. Repetitive processing of transmission and reception by device 2 continues until the host terminal returns an ACK. Since the host terminal performs reception by the pulse radio transmission method within a superframe, repetitive processing is completed within approximately 65 ms. Accordingly, battery power consumption can be reduced to a minimum.

Meanwhile, let us assume that the host terminal illustrated in FIG. 13B has not initially established a superframe by the MB-OFDM method and is engaging in communication by the pulse radio transmission method. In order to check the presence/absence of devices desiring to join the beacon network, the host terminal repetitively performs reception (MB- OFDM RX) and transmission (MB-OFDM TX) by the MB-OFDM method. A superframe repetition period shall suffice as the repetition period, whereby beacon signal reception and transmission are to be performed during a beacon period. Basically, a reception mode by the pulse radio transmission method (Pulse RX) is to be continued in remaining periods other than the beacon period in the superframe, whereby communication is performed by switching to transmission by the pulse radio transmission method (Pulse TX) as appropriate.

Let us now assume that device 1 illustrated in FIG. 13B is an MB-OFDM terminal.

Device 1 is initially not participating in the beacon group but is to join afterwards. Device 1 is capable of receiving a beacon signal transmitted from the host terminal, and by further returning a beacon signal, is able to establish participation in the beacon group and exchange information with the host terminal.

Let us assume that device 2 illustrated in FIG. 13B is a pulse UWB terminal and is a stereo acoustic apparatus to which power is supplied from, for example, a battery. Let us also assume that device 2 is an apparatus that obtains music information from a network or a host and replays the music information.

Device 2 repetitively performs transmission (Pulse TX) and reception (Pulse RX) by the pulse radio transmission method to/from the host terminal during an initial period illustrated in FIG. 13B, and transmits/receives data with relatively large capacity. At this point, since the host terminal has not yet established a beacon group by the MB-OFDM method, transmission/reception by the pulse UWB method can be performed during periods other than the beacon period as described above. Device 2 can obtain music information and the like from the host terminal during such periods in which the pulse UWB method can be used. When a beacon group by the MB-OFDM method has been formed, while the period (MAS period) in which information can be transmitted/received by device 2 becomes shorter, a certain level of throughput can be obtained in cases such as that illustrated in FIG. 13B. After obtaining music information and the like, device 2 can terminate transmission/reception by the pulse radio transmission method and transition to the sleep mode.

As seen, by switching to communication using an OFDM method or to communication using a pulse UWB or CDMA method depending on a necessary communication rate, a wireless communication system that reduces power consumption to a minimum can be realized. In such cases, since circuits corresponding to the respective communication systems are required to be implemented, respective circuit sizes thereof are desirably minimized. A terminal or a device equipped with a receiver according to the present invention is able to use primary circuits of a front end section for high-rate communication and low-rate communication alike, and in the pulse UWM method of low-rate communication, is further capable of performing frequency conversion, quantization, and demodulation with a single circuit block.

In other words, with a receiver according to the present exemplary embodiment, by having integration capacitor 303 perform a reset operation based on a judgment result of comparator 306 during demodulation of a pulse UWB signal that is low-rate communication and having integration capacitor 303 periodically perform reset operations during a frequency conversion of an MB-OFDM signal that is high-rate communication, first switch 302, integration capacitor 303, and reset circuit 304 perform a frequency conversion of an MB-OFDM signal. Consequently, low-rate communication and high-rate communication can be performed with one transceiver, and communication can be performed with low power consumption because frequency conversion and demodulation can be executed with one circuit when at a low rate.

It is anticipated that a future home network environment will involve communication between home electronics related to household duties, the home, and entertainment (including so-called white goods such as washing machines, refrigerators, and microwave ovens, air conditioners, stereo acoustic apparatuses, security devices, security cameras, intercoms, as well as audio-visual equipment accommodating high-definition radio transmission, and the like), and the emergence of a wireless communication environment encompassing such home electronics and a home server. A wireless communication system is anticipated which is configured by a home server that accommodates from low-rate communication to high-rate communication, and dedicated terminals for low-rate communication or dedicated terminals for high-rate communication in the periphery of the home server, or terminals or the like that accommodate both communication methods.

A wireless communication system is conceivable which is installed with a home server equipped with a receiver according to the third and fourth exemplary embodiments, and in a periphery thereof, low-speed terminals such as white goods equipped with a receiver according to the first exemplary embodiment and which perform low-rate communication and audio-visual transmission terminals equipped with a receiver according to the second exemplary embodiment and which perform high-rate communication. In such environments, the present invention is capable of providing a wireless communication system featuring small circuit sizes, low cost, and low power.

Generally, transmission rates can be varied to a certain degree even in communication using an OFDM method. The OFDM method is considered to be a communication method that includes scalability or, in other words, a characteristic in which power consumption varies according to transmission rate. However, since the OFDM method requires FFT processing and IFFT processing as well as an amplifier and a filter circuit that operate in the 250 MHz band, a limit to reducing power is becoming more apparent with wireless devices that accommodate the OFDM method.

Since a wireless communication apparatus equipped with a receiver according to the present invention enables a transition to a pulse radio transmission method having low power consumption during low-rate communication, an optimum communication method can be set depending on the power conditions of respective devices in a future home network system environment.

Although the present invention has been described with reference to exemplary embodiments, the present invention is not limited to the exemplary embodiments described above. It will be obvious to those skilled in the art that various modifications can be made to the configurations and details of the present invention without departing from the spirit and scope thereof.

The present application claims priority based on Japanese Patent Application No. 2007-261982, filed on Oct. 5, 2007, which is hereby incorporated by reference in its entirety.

The invention claimed is:

1. A receiver comprising:
    an amplifier that amplifies a received broadband signal up to a predetermined level;
    a first switch that switches an output signal from the amplifier;
    a signal generator that generates a signal for controlling a switching operation of the first switch;

an integration capacitor that integrates an output signal from the first switch;
a comparator that compares an output voltage from the integration capacitor with a predetermined voltage; and
a reset circuit that discharges electrical charges accumulated in the integration capacitor based on a comparison result from the comparator.

2. The receiver according to claim 1, wherein the broadband signal is a pulse radio frequency signal.

3. The receiver according to claim 2, further comprising:
a voltage supply that supplies the comparator with a first comparison voltage for detecting a positive correlation with the broadband signal and a second comparison voltage for detecting a negative correlation with the broadband signal; and
a controller that controls the voltage supply so that values of the first comparison voltage and the second comparison voltage become narrower in stages.

4. The receiver according to claim 2, further comprising:
a voltage supply that supplies the comparator with a first comparison voltage for detecting a positive correlation with the broadband signal and a second comparison voltage for detecting a negative correlation with the broadband signal; and
a controller that controls the voltage supply so that values of the first comparison voltage and the second comparison voltage vary according to a binary search method.

5. The receiver according to claim 2, wherein the comparator includes
a plurality of comparator elements that compare an output voltage of the integration capacitor with a comparison voltage that is a preset predetermined voltage, and
a receiver that further comprises a voltage supply that supplies comparison voltages that are respectively different from each other to the plurality of comparator elements.

6. The receiver according to claim 2, wherein the amplifier includes an inductor to be connected between a power supply potential and an output terminal.

7. The receiver according to claim 2, wherein the amplifier includes a cascode-structure transistor to be connected between a ground potential and an output terminal.

8. A wireless communication system comprising:
a transmitter for transmitting a broadband signal; and
the receiver according to claim 2 which receives the broadband signal.

9. The receiver according to claim 1, further comprising:
a voltage supply that supplies the comparator with a first comparison voltage for detecting a positive correlation with the broadband signal and a second comparison voltage for detecting a negative correlation with the broadband signal; and
a controller that controls the voltage supply so that values of the first comparison voltage and the second comparison voltage vary according to a binary search method.

10. The receiver according to claim 1, wherein the comparator includes
a plurality of comparator elements that compare an output voltage of the integration capacitor with a comparison voltage that is a preset predetermined voltage, and
a receiver that further comprises a voltage supply that supplies comparison voltages that are respectively different from each other to the plurality of comparator elements.

11. The receiver according to claim 1, wherein the amplifier includes an inductor to be connected between a power supply potential and an output terminal.

12. The receiver according to claim 1, wherein the amplifier includes a cascode-structure transistor to be connected between a ground potential and an output terminal.

13. The receiver according to claim 1, wherein:
the broadband signal is an MB-OFDM signal;
the receiver further comprising
a second switch that supplies the reset circuit with a reset signal for discharging electrical charges accumulated in the integration capacitor at predetermined time intervals generated by the signal generator; and
a controller that controls switching operations of the second switch.

14. A wireless communication system comprising:
a transmitter for transmitting a broadband signal; and
the receiver according to claim 1 which receives the broadband signal.

15. A receiver comprising:
an amplifier that amplifies a received broadband signal up to a predetermined level;
a first switch that switches an output signal from the amplifier;
a signal generator that generates a signal for controlling a switching operation of the first switch;
an integration capacitor that integrates an output signal from the first switch;
a comparator that compares an output voltage from the integration capacitor with a predetermined voltage;
a reset circuit that discharges electrical charges accumulated in the integration capacitor based on a comparison result from the comparator;
a voltage supply that supplies the comparator with a first comparison voltage for detecting a positive correlation with the broadband signal and a second comparison voltage for detecting a negative correlation with the broadband signal; and
a controller that controls the voltage supply so that values of the first comparison voltage and the second comparison voltage become narrower in stages.

16. A wireless communication system comprising:
a transmitter for transmitting a broadband signal; and
the receiver according to claim 15 which receives the broadband signal.

17. A reception method comprising:
amplifying a received broadband signal up to a predetermined level;
switching the amplified signal at a predetermined frequency using a switching element;
directly integrating the switched signal using an integration capacitor;
comparing the integrated voltage with a predetermined voltage using a comparator; and
resetting a voltage corresponding to electrical charges accumulated by the integration operation based on the comparison result.

18. The method according to claim 17, further comprising switching between demodulation of a pulse radio frequency signal that is the broadband signal and demodulation of an MB-OFDM signal that is the broadband signal.

19. The method according to claim 18, further comprising receiving pulse radio frequency signals at predetermined time intervals even when participating in an MB-OFDM beacon group.

20. The method according to claim 18, further comprising receiving MB-OFDM signals at predetermined time intervals even when an MB-OFDM signal beacon group is not being detected.

* * * * *